United States Patent [19]
Wright, Jr.

[11] Patent Number: 5,524,726
[45] Date of Patent: Jun. 11, 1996

[54] SWING ARM SUPPORTED ELECTRICAL DRIVE ASSEMBLY FOR POWERING CYCLES

[75] Inventor: John R. Wright, Jr., Windsor, Conn.

[73] Assignee: Tenergy L.L.C., New Britain, Conn.

[21] Appl. No.: 423,504

[22] Filed: Apr. 18, 1995

[51] Int. Cl.$^6$ ................................................. B62K 11/10
[52] U.S. Cl. ........................... 180/220; 180/227; 280/285
[58] Field of Search ................................... 180/220, 227, 180/228, 65.1, 65.5, 65.3, 65.6, 68.5, 11, 12, 15, 16; 280/284, 285

[56] References Cited

U.S. PATENT DOCUMENTS

| | | | |
|---|---|---|---|
| 696,001 | 3/1902 | Bendix | 180/227 |
| 2,705,154 | 3/1955 | Torre | 180/227 |
| 3,372,768 | 3/1968 | Wresch | 180/220 |
| 3,773,131 | 11/1973 | Jaulmes | 180/34 |
| 3,937,291 | 2/1976 | Hanagan | 180/220 |
| 4,077,485 | 3/1978 | Bonora et al. | 180/68.5 |
| 4,413,692 | 11/1983 | Clifft | 180/11 |
| 4,436,174 | 3/1984 | Morisono | 180/227 |
| 5,036,938 | 8/1991 | Blount et al. | 180/68.5 |
| 5,127,488 | 7/1992 | Shanahan | 180/11 |
| 5,313,191 | 5/1994 | Yamashita et al. | 340/439 |
| 5,350,029 | 9/1994 | Figueroa | 180/15 |

FOREIGN PATENT DOCUMENTS

| | | | |
|---|---|---|---|
| 404358983 | 12/1992 | Japan | 180/65.5 |
| 93017904 | 9/1993 | WIPO | 180/220 |

*Primary Examiner*—Anne Marie Boehler
*Attorney, Agent, or Firm*—Peter L. Costas

[57] ABSTRACT

An electrically powered cycle has a frame, an axle, a drive wheel, an electric motor, a motor controller, an electric power supply, a power supply charger, and a swing arm pivotally mounts the electric power supply and electric motor on the cycle frame. The drive wheel is rotatably supported on the axle, which, in turn, is supported in the swing arm adjacent the rear end of the cycle. This end of the swing arm is coupled to the shock absorbers which connect the frame to the axle so that the drive wheel moves relative to the frame. The other end of the swing arm is pivotally mounted on the frame. The electric power supply and the electric motor are supported on the swing arm intermediate the ends thereof.

18 Claims, 3 Drawing Sheets

SWING ARM SUPPORTED ELECTRICAL DRIVE ASSEMBLY FOR POWERING CYCLES

BACKGROUND OF THE INVENTION

The present invention relates to power supplies and motors for electrically powered vehicles, and more particularly, to a swing arm mount which pivotally supports an electric power supply and an electric drive motor on the vehicle frame.

Swing arm mounts have been previously employed to mount both the gasoline motors and the drive wheels of motorcycles to enable the motor to move relative to the frame of the cycle. While one end of the mount is pivotally mounted to the frame of the cycle, the other end of the mount is coupled to the frame through shock absorbers in order to minimize the shock transmitted to both the cycle and the operator when the drive wheel hits a bump. In addition, mounting both the motor and the drive wheel on the swing arm enables the motor to maintain the same operative orientation relative to the drive wheel irrespective of the movement of the drive wheel relative to the frame.

Exemplary of such a mounting assembly for mounting an electric motor is Hannigan U.S. Pat. No. 3,937,291.

Although the Hannigan swing arm mount offers the advantages of mounting the motor on the swing arm, it does not support the electric power supply. In Hannigan, the electric power supply is mounted directly on the cycle frame and motion of the motor relative to the power supply must be accommodated.

It is an object of the present invention to provide a novel swing arm mount which pivotally mounts both an electric power supply and an electric motor on the frame of an electric cycle, and allows the electric power supply, motor, and rear wheel to move in unison relative to the cycle frame.

It is also an object to provide such a swing arm mount in which access to the motor and power assembly is facilitated.

Another object is to provide a modular electronic drive assembly and motor mount which is readily adapted for assembly onto electric cycles of various manufacturers.

Yet another object is to provide a swing arm mount which is rugged and long lived, and which may be fabricated relatively easily and economically.

SUMMARY OF THE INVENTION

It has now been found that the foregoing and related objects may be readily attained in an electrically powered vehicle having a frame, an axle, a drive wheel rotatably supported on the axle, and shock absorber means having one end connected to the frame and the other end connected to the axle so that the drive wheel moves relative to the frame. The drive wheel is operatively connected to an electric motor to effect rotation thereof. The electric motor is controlled by a controller and powered by an electric power supply, which in turn, is recharged by a charger. Both the electric motor and the electric power supply are supported by means intermediate the ends of a pivotable swing arm. The swing arm has one end pivotally mounted on the frame and another end coupled to the shock absorber means, and the axle is supported in the swing arm adjacent the other end.

Generally, the pivotable swing arm includes a spaced pair of elongated side members having upwardly extending arms at both ends thereof. The upwardly extending arms at the one end of the swing arm are pivotally mounted on the frame and the upwardly extending arms at the other end are connected to the other end of the shock absorber means.

Desirably, the electric power supply is a battery, and the battery, charger and controller comprise an electric power assembly all supported on the mounting member intermediate the ends thereof.

The electric power assembly is preferably disposed within an enclosure and mounted on a base member extending horizontally between and secured to the side members of the swing arm. The base member has an upstanding flange extending about the periphery thereof to further restrain the enclosure. A cover member is disposed above the electric power assembly and includes a depending flange extending about its periphery. The electric power assembly enclosure is releasably secured to the swing arm by connecting means between the base member and the cover member.

In accordance with a preferred embodiment, the electric motor is mounted on a bracket which has one end pivotally mounted on one of the elongated side members intermediate its ends and has another end which has the electric motor mounted thereon. Desirably, each of the elongated side members includes an aperture adjacent its other end thereof through which the drive wheel axle extends.

Conveniently, the pivotable swing arm includes a tubular member extending horizontally between and seated in apertures in the upwardly extending arms of the side members at its one end. The frame has depending portions adjacent the outer surface of the arms and apertures therein aligned with the apertures of the arms, and a rod extends through the tubular member and through the apertures in the frame. The tubular member is pivotable about the rod, and fastening means on each end of the rod retain the rod in the frame.

DETAILED DESCRIPTION OF THE PREFERRED EMBODIMENT

Figure 1:
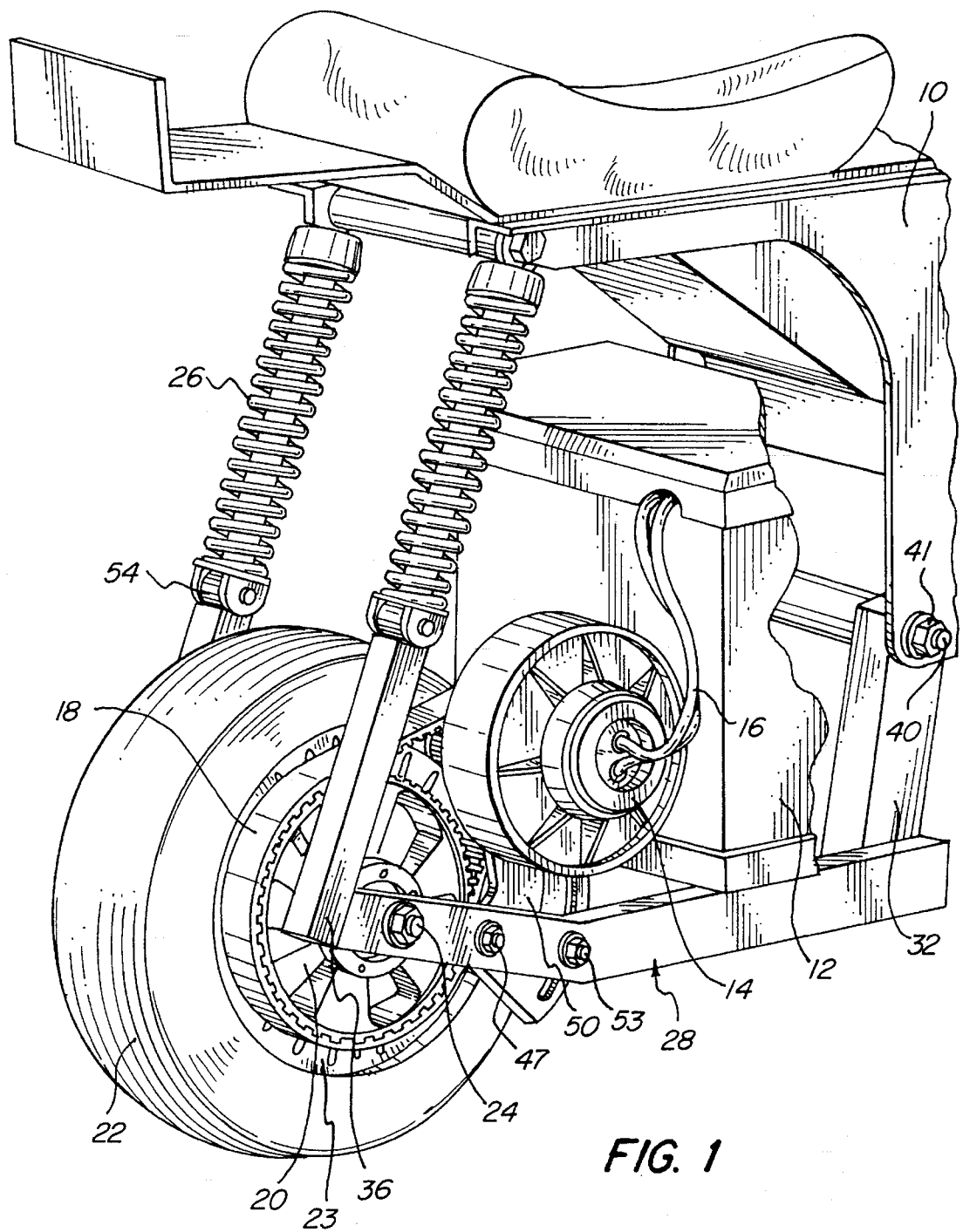
FIG. 1 is a fragmentary perspective view of an electric cycle incorporating the swing arm mount assembly of the present invention.
Figure 2:
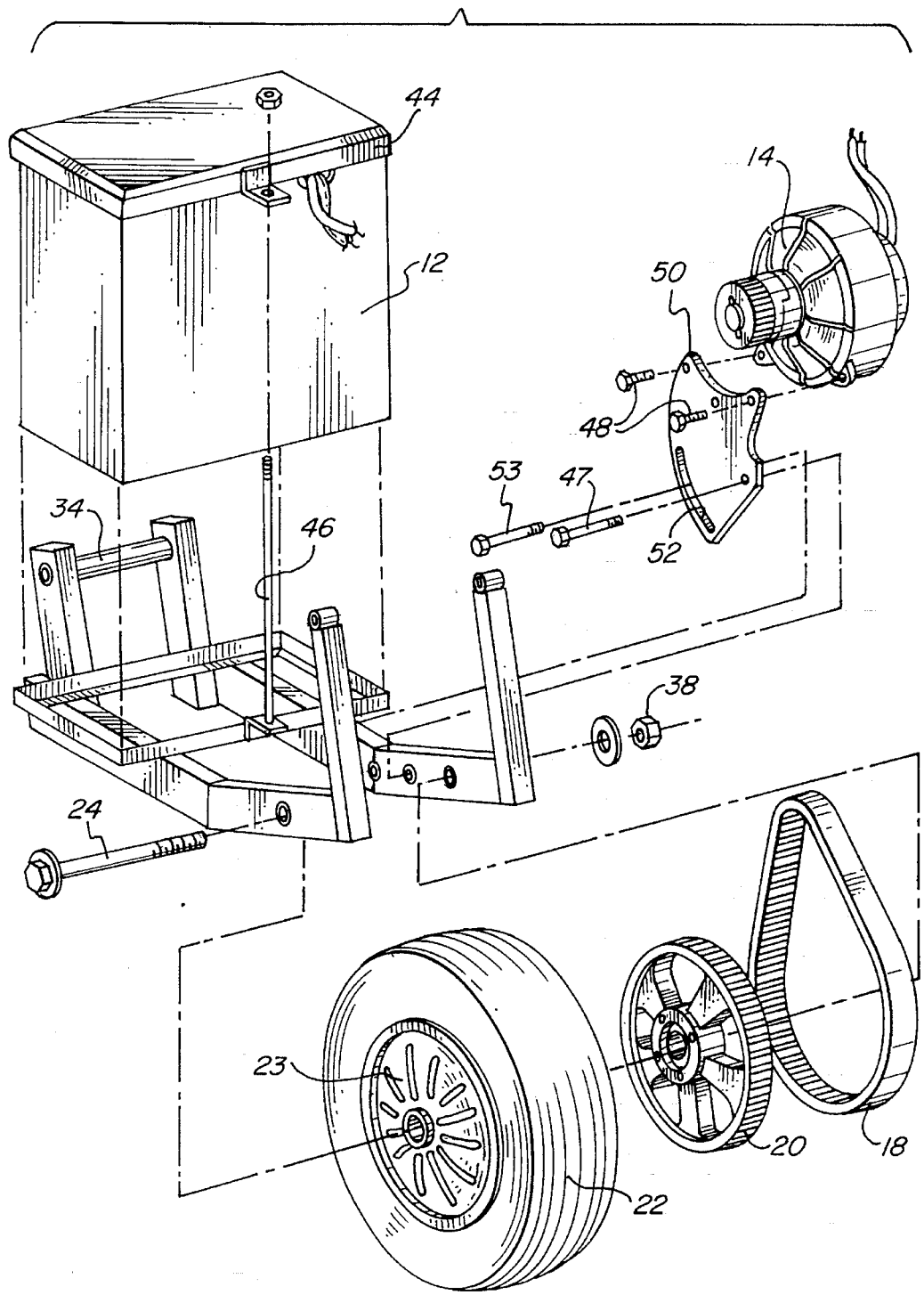
FIG. 2 is an exploded view of the swing arm mount assembly.
Figure 3:
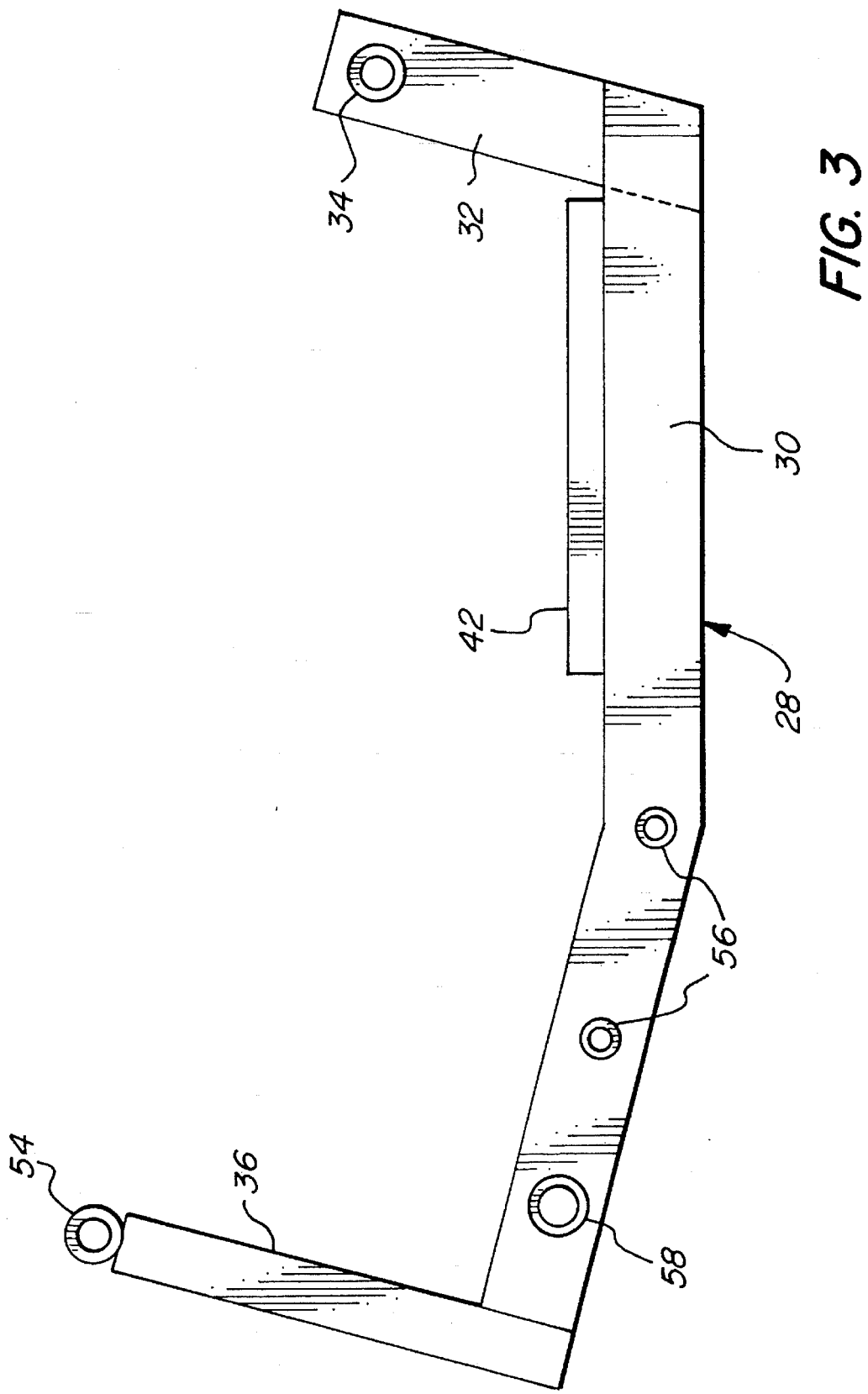
FIG. 3 is a side elevational view of the swing arm mount assembly.

Turning first to FIG. 1, therein illustrated is the rear portion of an electric cycle having a frame 10 which has connected thereto a swing arm embodying the present invention and generally designated by the numeral 28. The swing arm 28 has mounted thereon the components of the cycle's electric drive assembly including an electric power assembly 12, the electric motor 14, and a wheel 23.

The swing arm 28 has a framework which is assembled from rectangular tubing welded together to provide a rigid structure which is symmetrical about the cycle's longitudinal center line. The forward portion of the swing arm 28 includes a spaced pair of upwardly extending arms 32, and a cylindrical sleeved bushing 34 extending horizontally between, and is seated in apertures in, the upper portions of the arms 32. The lower ends of the forward arms 32 are welded to the ends of elongated side rails 30 extending generally horizontally to approximately the middle of the swing arm 28 and then angling slightly upwardly towards the rear of the swing arm 28. Another pair of upwardly extending arms 36 is attached at their lower ends to the rear end of the side rails 30. The forward arms 32 are directly connected to the cycle frame 10, and the rear arms 36 are connected to the frame 10 through the shock absorbers 26. The arms 32, 36 support the entire structure of the swing arm 28.

As best illustrated in FIG. 1, the front of the swing arm 28 is pivotally connected to the cycle frame 10, by an axle bolt 40 which extends through a sleeved bushing 34 and through apertures (not shown) in the depending portions of the frame 10 adjacent the outer surface of the arms 32. The sleeved bushing 34 is pivotable about the axle bolt 40, and the axle bolt 40 remains stationary and is retained in place by a nut 41 fastened to the threaded end of the axle bolt 40.

As illustrated in FIG. 1, a pivotal connection of the rear arms 36 to the shock absorbers 26 is provided by a generally cylindrical sleeve 54 welded to the top of the rear arms 36 which seats between the ears of the bracket 55 and is pivotable therein about the pin 57. The shock absorbers 26 have their upper ends secured directly to the frame 10.

As a result of the pivotal mounting of the arms 32, 36, the entire swing arm 28 moves as a unitary structure with respect to the cycle frame 10 while providing a rigid platform for all of the major components of the electric drive assembly which are mounted upon the swing arm 28 intermediate its ends.

The wheel 23 is rotatably supported by bearings (not shown) on a stationary axle bolt 24 which extends through apertures 58 in the side rails 30 and is retained in place by a nut 38 fastened on its threaded end. As illustrated in FIG. 1, the wheel 23 has a toothed pulley element 20 thereon about which extends the drive belt 18 which in turn is driven by the motor 14. The motor 14 is secured to a bracket 50 by bolts 48, and the bracket 50 has its lower end secured to the swing arm 28 by bolts 47 and 53 which seat in swing arm apertures 56. The lower portion of the bracket 50 has an arcuate slot 52 in which the adjusting bolt 53 seats along its front edge to allow the bracket 50 to pivot about the bolt 47, thereby enabling the tension adjustment of the belt 18.

Electrical current is supplied to the motor 14 through electrical cables 16 connecting the motor 14 to the electric power assembly 12. The electric power assembly 12 includes within the enclosure (i), a battery (not shown) for powering the electric motor 14, (ii) a charger (not shown) for charging the battery, and (iii) an electronic controller (not shown) for controlling power delivered to the electric motor 14. The electric power assembly 12 is supported by a tray 42 having an upstanding flange extending about its periphery, and it extends horizontally between and is welded to the side rails 30. Seated atop the electric power assembly 12 is a cover 44 having a depending flange extending about its periphery. The electric power assembly 12 is secured to the swing arm by a threaded rod 46 which extends between the tray 42 and the cover 44.

The main advantage of the swing arm 28 is its ability to provide easy access to the key components of the electric drive assembly, and thereby reduce the labor required for maintenance. In order to access the components for maintenance, the operator simply unbolts the two shock absorbers 26 from the cycle frame 10 to allow the entire swing arm 28 to pivot about the axle bolt 40 at its forward end. Once the swing arm 28 is lowered, easy access is provided to all the components of the electric drive assembly, including the electric power assembly 12, the electric motor 14, and the wheel 23. If desired, the entire electric drive assembly may be removed by simply unbolting the remaining connection, the axle bolt 40.

Another major advantage of the swing arm 28 is its adaptability of assembly onto a variety of frame styles including existing gasoline powered cycles. This adaptability simplifies and reduces the cost of converting a gasoline powered cycle to a zero-emission, electric cycle.

When the cycle is in operation, the swing arm 28 provides a stable mounting platform for all the components of the electrical drive assembly relative to each other, while simultaneously allowing all the components to move relative to the frame of the cycle. The relative stability of the swing arm 28 as a mounting platform eliminates relative movement between electric drive assembly components which would otherwise cause additional stresses on power transmission connectors such as the drive belt 18 or electric cables 16. This increases the survivability of these connectors and may also reduce the cost of the overall system by allowing thinner, less expensive electrical wire to be substituted for thicker, more expensive electrical cable 16.

In addition to increasing cable survivability, maintaining the relative position of the motor 14 with respect to the drive pulley 20 eliminates the necessity for a tensioner for belt 18 and thereby saves the cost of a tensioner unit, reduces mechanical losses caused by a tensioner, and reduces maintenance otherwise necessitated by the need for tensioner adjustment.

Allowing the electric drive assembly components to move relative to the frame of the cycle also increases the efficiency of the overall electrical system. If the power assembly 12 utilizes a typical lead-acid storage battery (not shown), mounting it on the swing arm 28 increases the electrical efficiency of the battery. This efficiency increase is byproduct of the articulation of the swing arm 28, which rigorously agitates the electrolyte in the battery, more thoroughly exposes the electrode to the electrolyte solution, and thereby increases the current delivering capacity of the battery.

As will be appreciated, the various electric drive assembly components may be secured to the swing arm in several ways, and the means of connecting the swing arm itself to the cycle frame may vary. Furthermore, the relatively small and lightweight charger and controller may be mounted elsewhere on the cycle and not on the swing arm without sacrificing any of the efficiencies gained by mounting the relatively large and heavy power supply and motor together on the swing arm.

As will be further appreciated, the characteristics of several of the components may vary from that which is illustrated in the accompanying drawings. For example, the drive belt and pulley may be replaced by a direct drive or chain drive, and components such as the tubular structural members may be replaced by solid members or by members with different shaped cross sections.

In addition to its use on cycles, it will be appreciated that the swing arm may be utilized on various other electric vehicles such as scooters, and three-wheel and four-wheel utility vehicles.

Although various materials may be employed for the construction of the components of the swing arm, it is preferably made from structural steel stock for maximum dimensional stability, long life, and economical cost.

Thus, it can be seen from the foregoing detailed description and the attached drawings that the swing arm of the present invention pivotally supports the entire electric drive assembly on the frame of an electric cycle and enables the electric power assembly, motor, and rear wheel to move in unison relative to the cycle frame. Moreover, the swing arm simplifies access to the motor and electric power assembly.

Having thus described the invention, what is claimed is:

1. In an electrically powered vehicle having a frame, an axle, a drive wheel rotatably supported by said axle, and shock absorber means having one end connected to said frame and the other end connected to said axle so that said drive wheel is movable relative to said frame, the improvement comprising:
   (a) an electric motor operatively connected to said drive wheel to effect rotation thereof;
   (b) an electric power supply for said electric motor;
   (c) a charger for charging said electric power supply;
   (d) a controller for controlling said electric motor;
   (e) a pivotable mounting member pivotally mounting said electric power supply on said cycle frame, said mounting member having one end pivotally mounted on said frame and the other end coupled to said shock absorber means, said axle being supported in said mounting member adjacent said other end thereof, said pivotable mounting member including a spaced pair of elongated side members having upwardly extending arms at both ends thereof, said upwardly extending arms at said one end of said mounting member being pivotally mounted on said frame and said upwardly extending arms at the other end being connected to said other end of said shock absorber means;
   (f) means supporting said electric power supply on said mounting member intermediate the ends thereof; and
   (g) means supporting said electric motor on said mounting member intermediate the ends thereof.

2. An electrically powered vehicle in accordance with claim 1 wherein said pivotable mounting member includes a tubular member extending horizontally between and seated in apertures in said upwardly extending arms of said side members at said one end thereof, said frame having depending portions adjacent the outer surface of said arms and apertures therein aligned with said apertures of said arms, a rod extending through said tubular member and through said apertures in said frame, said tubular member being pivotable about said rod, and fastening means on each end of said rod to retain said rod in said frame.

3. An electrically powered vehicle in accordance with claim 1 wherein said means for supporting said electric power supply includes a base member extending horizontally between and secured to said side members.

4. An electrically powered vehicle in accordance with claim 3 wherein said electric power supply is a battery for powering said electric motor.

5. An electrically powered vehicle in accordance with claim 4 wherein said battery of said electric power supply, said charger for charging said battery, and said controller for controlling said electric motor, comprise an electric power assembly all supported on said mounting member intermediate the ends thereof.

6. An electrically powered vehicle in accordance with claim 5 wherein said electric power assembly is disposed within an enclosure.

7. An electrically powered vehicle in accordance with claim 6 wherein said enclosure includes a cover member disposed above said electric power assembly, said cover being releasably secured to said base by connecting means whereby said electric power assembly enclosure is secured to said pivotable mounting member between said base member and said cover member.

8. An electrically powered vehicle in accordance with claim 7 wherein said base member includes an upstanding flange extending about the periphery thereof.

9. An electrically powered vehicle in accordance with claim 8 wherein said cover member includes a depending flange extending about the periphery thereof.

10. An electrically powered vehicle in accordance with claim 1 wherein said means supporting said electric motor includes a bracket having one end thereof mounted on one of said elongated side members intermediate said ends thereof, said bracket having another end having said electric motor mounted thereon.

11. An electrically powered vehicle in accordance with claim 10 wherein said bracket for said electric motor is pivotally mounted on one of said side members intermediate said ends thereof.

12. An electrically powered vehicle in accordance with claim 1 wherein each of said elongated side members includes an aperture adjacent said other end thereof through which said drive wheel axle extends.

13. In an electrically powered cycle having a frame, an axle, a drive wheel rotatably supported by said axle, and shock absorber means having one end connected to said frame and the other end connected to said axle so that said drive wheel is moveable relative to said frame, the improvement comprising:
   (a) an electric motor operatively connected to said drive wheel to effect rotation thereof;
   (b) an electric power assembly for said electric motor including (i) a battery for powering said electric motor, (ii) a charger for charging said battery, and (iii) a controller for controlling said electric motor;
   (c) a pivotable mounting member pivotally mounting said electric power assembly on said cycle frame, said mounting member having one end pivotally mounted on said frame and the other end coupled to said shock absorber means, said axle being supported in said mounting member adjacent said other end thereof, said pivotable mounting member including a spaced pair of elongated side members having upwardly extending arms at both ends thereof, said upwardly extending arms at said one end of said mounting member being pivotally mounted on said frame and said upwardly extending arms at the other end being connected to said other end of said shock absorber means;
   (d) means supporting said electric power assembly on said mounting member intermediate the ends thereof, said electric power assembly disposed within an enclosure; and
   (e) means supporting said electric motor on said mounting member intermediate the ends thereof, said means supporting said electric motor including a bracket having one end thereof mounted on one of said elongated side members intermediate said ends thereof, said bracket having another end having said electric motor mounted thereon.

14. An electrically powered vehicle in accordance with claim 13 wherein said pivotable mounting member includes a tubular member extending horizontally between and seated in apertures in said upwardly extending arms of said side members at said one end thereof, said frame having depending portions adjacent the outer surface of said arms and apertures therein aligned with said apertures of said arms, a rod extending through said tubular member and through said apertures in said frame, said tubular member being pivotable about said rod, and means for fastening each end of said rod to retain said rod.

15. An electrically powered vehicle in accordance with claim 13 wherein said means for supporting said electric power assembly includes a base member extending horizontally between and secured to said side members.

16. An electrically powered vehicle in accordance with claim 15 wherein said enclosure includes a cover member disposed above said electric power assembly, said cover member being releasably secured to said base by connecting means whereby said electric power assembly enclosure is secured to said pivotable mounting member between said base member and said cover member.

17. An electrically powered vehicle in accordance with claim 13 wherein said bracket for said electric motor is pivotally mounted on one of said side members intermediate said ends thereof.

18. An electrically powered vehicle in accordance with claim 13 wherein each of said elongated side members includes an aperture adjacent said other end thereof through which said drive wheel axle extends.

* * * * *